United States Patent
Chen et al.

(10) Patent No.: US 6,267,514 B1
(45) Date of Patent: Jul. 31, 2001

(54) DUPLEX FIBER OPTIC CONNECTOR SYSTEM AND METHOD OF FABRICATION

(75) Inventors: Wenzong Chen, Darien; Igor Grois, Northbrook; Scot A. Ernst, Naperville, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/173,505

(22) Filed: Oct. 15, 1998

(51) Int. Cl.[7] ........................................................ G02B 6/38
(52) U.S. Cl. .............................. 385/71; 385/53; 385/59; 385/89
(58) Field of Search .................................. 385/71, 75, 76, 385/78, 89, 53, 59

(56) References Cited

U.S. PATENT DOCUMENTS

| 5,293,581 | 3/1994 | DiMarco | 385/76 |
| 5,325,454 | 6/1994 | Rittle et al. | 385/76 |
| 5,343,547 | 8/1994 | Palecek et al. | 375/76 |
| 5,386,487 | * 1/1995 | Briggs et al. | 385/59 |
| 5,475,781 | 12/1995 | Chang et al. | 385/76 |
| 5,598,495 | 1/1997 | Rittle et al. | 385/75 |

* cited by examiner

Primary Examiner—Phan T. H. Palmer
(74) Attorney, Agent, or Firm—A. A. Tirva

(57) ABSTRACT

A system for maintaining a pair of fiber optic connectors in a side-by-side relation with float therebetween, along with a method of fabricating the connectors. A first connector housing is provided for receiving a first optical fiber plug, and including a first latch molded integrally with the first connector housing. A second connector housing is provided for receiving a second optical fiber plug. A latch member is mounted on the second connector housing in loose engagement therewith and includes a second latch for interengagement with the first latch on the first connector housing. Therefore, the connector housings are held in a side-by-side relationship with float therebetween provided by the loosely engaged latch member.

18 Claims, 7 Drawing Sheets

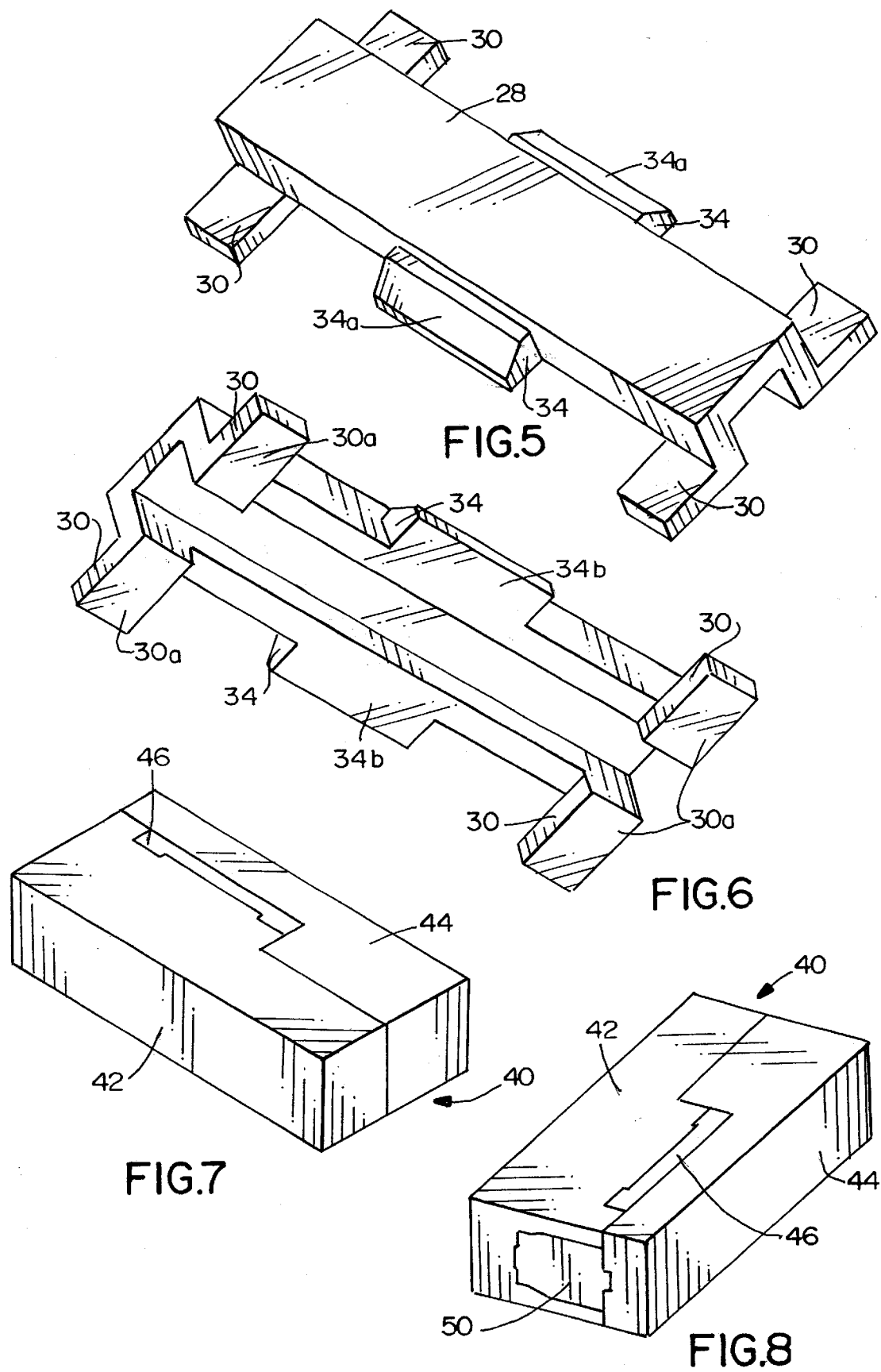

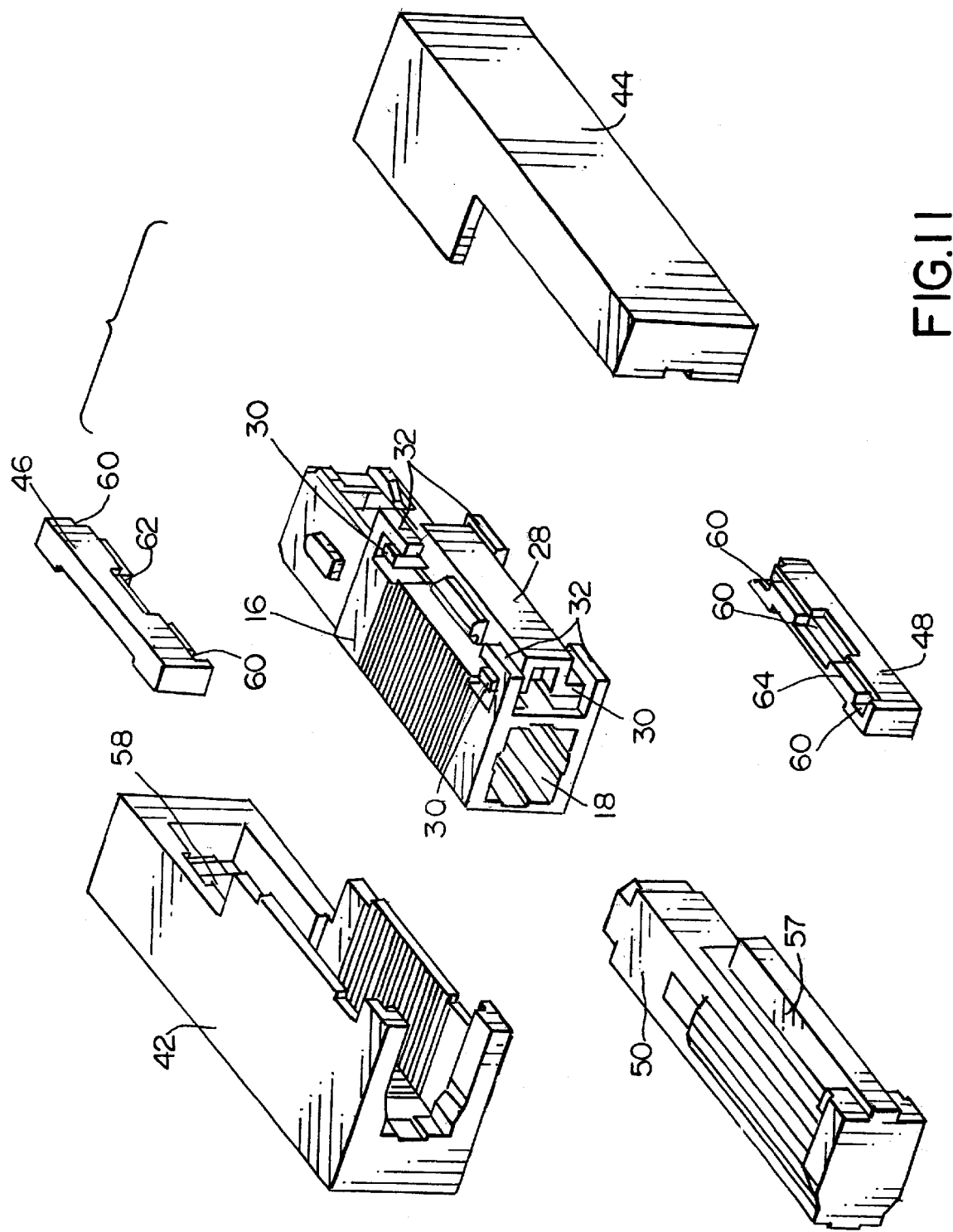

DUPLEX FIBER OPTIC CONNECTOR SYSTEM AND METHOD OF FABRICATION

FIELD OF THE INVENTION

This invention generally relates to the art of fiber optic connectors and, particularly, to a system for interconnecting a pair of individual fiber optic connectors, along with a method of fabricating the connectors.

BACKGROUND OF THE INVENTION

Fiber optic devices use single or multiple strands of fibers each having an inner circular glass core coated with a circumferential cladding having a different index of refraction. Light is transmitted along the core and reflected from the interface between the core and cladding. Such devices can be used as transmission lines for transmitting information bearing light energy. A transmission line can be formed from a single fiber or it can include a plurality of fibers bundled together. Additionally, several transmission lines can be arranged in parallel for the simultaneous transmission of information along each of the separate lines.

Originally, fiber optic systems utilized simplex interconnection systems with single connector plugs terminating single fiber optic cables. In a simplex system, either transmission or reception of information can take place at one time. Consequently, simplex systems are limited in the amount of information that they can transmit and receive during a given period of time.

To increase the amount of information that can be communicated over fiber optic systems, multi-channel systems were developed. Such multi-channel systems include, for example, duplex connector plugs and cables which are capable of simultaneous transmission and reception. Thus, using a duplex system enables information to be transmitted at a much higher rate.

In order to manage the duplex connector plugs and cables, structures have been designed for interconnecting two fiber optic connectors in a side-by-side relationship forming a duplex connector. For instance, adapter structures have been designed to provide a pair of side-by-side through receptacles for receiving the pair of fiber optic connectors in a side-by-side arrangement. Not only do such duplex adapters increase costs by requiring an additional, somewhat bulky component, but it also is difficult to maintain proper axial alignment which is necessary for optimum signal transmission. Misalignment in such duplex connectors or adapters are caused by manufacturing inaccuracies or tolerances. Consequently, interconnection systems, adapters or the like have been designed for mounting a pair of fiber optic connectors in a side-by-side alignment with lateral floating therebetween generally perpendicular to their longitudinal axes in order to compensate for misalignment due to manufacturing tolerances and the like. These systems may be provided directly between the connector housings. The present invention is directed to providing improvements in such a floating system directly between a pair of side-by-side fiber optic connectors and which also eliminates separate floating mechanisms in interconnecting adapters or the like.

SUMMARY OF THE INVENTION

An object, therefore, of the invention is to provide a new and improved system for maintaining a pair of fiber optic connectors in a side-by-side relation with float therebetween, along with a method of fabricating the connectors.

In the exemplary embodiment of the invention, a first connector housing is provided for receiving a first optical fiber plug and includes a first latch molded integrally with the first connector housing. A second connector housing is provided for receiving a second optical fiber plug. A latch member is permanently molded onto the second connector housing in loose engagement therewith. The latch member includes a second latch for interengagement with the first latch on the first connector housing to hold the connector housings in a side-by-side relationship with float therebetween.

Preferably, the first latch on the first connector housing and the second latch on the latch member are structured to provide a snap-latch means. As disclosed herein, the first latch comprises at least one locking flange and the second latch comprises at least one chamfered snap flange for snapping into locking engagement with the locking flange.

The second connector housing and the latch member each include at least one retention arm molded integrally therewith. The retention arms are permanently molded in loose interengagement with each other. The retention arm on the second connector housing is a hooked arm, and the retention arm on the latch member is a projecting arm extending beneath the hooked arm. The latch member is generally rectangular, and a pair of the interengaging retention arms are provided at each corner of the latch member, with the second latch being located intermediate opposite ends of the latch member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 5 is a perspective view of the latch member;

FIG. 6 is a perspective view of the opposite side of the latch member;

FIGS. 7 and 8 are perspective views looking at opposite ends of a mold assembly for intermolding the second connector housing and the latch member as seen in FIG. 4; and FIGS. 9–11 are exploded perspective views of the components of the mold assembly surrounding the intermolded second connector housing and latch member.

DETAILED DESCRIPTION OF THE PREFERRED EMBODIMENT

Figure 1:
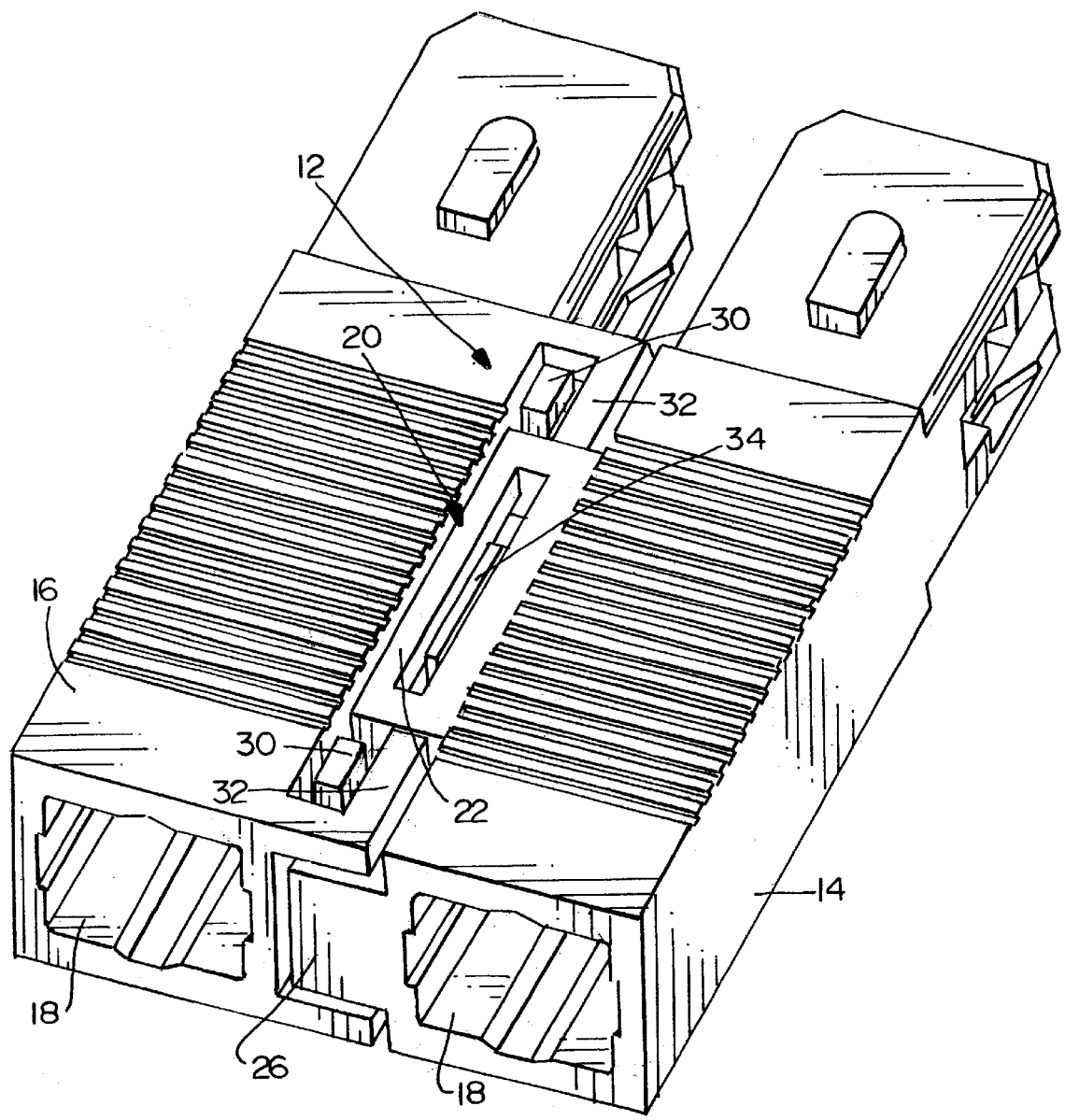
FIG. 1 is a perspective view of a pair of fiber optic connector housings maintained in a side-by-side relationship by the system of the invention.

Referring to the drawings in greater detail, and first to FIG. 1, the invention is embodied in a duplex interconnection system, generally designated 12, for maintaining a pair of fiber optic connectors in a side-by-side relationship with float therebetween. The entire connectors are not shown in the drawings. It is sufficient to state that the connectors include a first connector housing 14 and a second connector housing 16. The connector housings include through receptacles 18 for receiving first and second optical fiber plugs, as is known in the art. Specifically, connector housings 14 and 16 are of the well known "SC" type based on a push-pull concept. Basically, the duplex interconnection system 12 of the invention is provided between connector housings 14 and 16, and it is unnecessary to go into the details of the optical fiber plugs which are received by the housings. However, it should be understood that the duplex interconnection system of the invention is not limited to just "SC" type connectors. While FIG. 1 shows the connector housings interconnected, FIG. 2 shows the housings separated.

Figure 2:
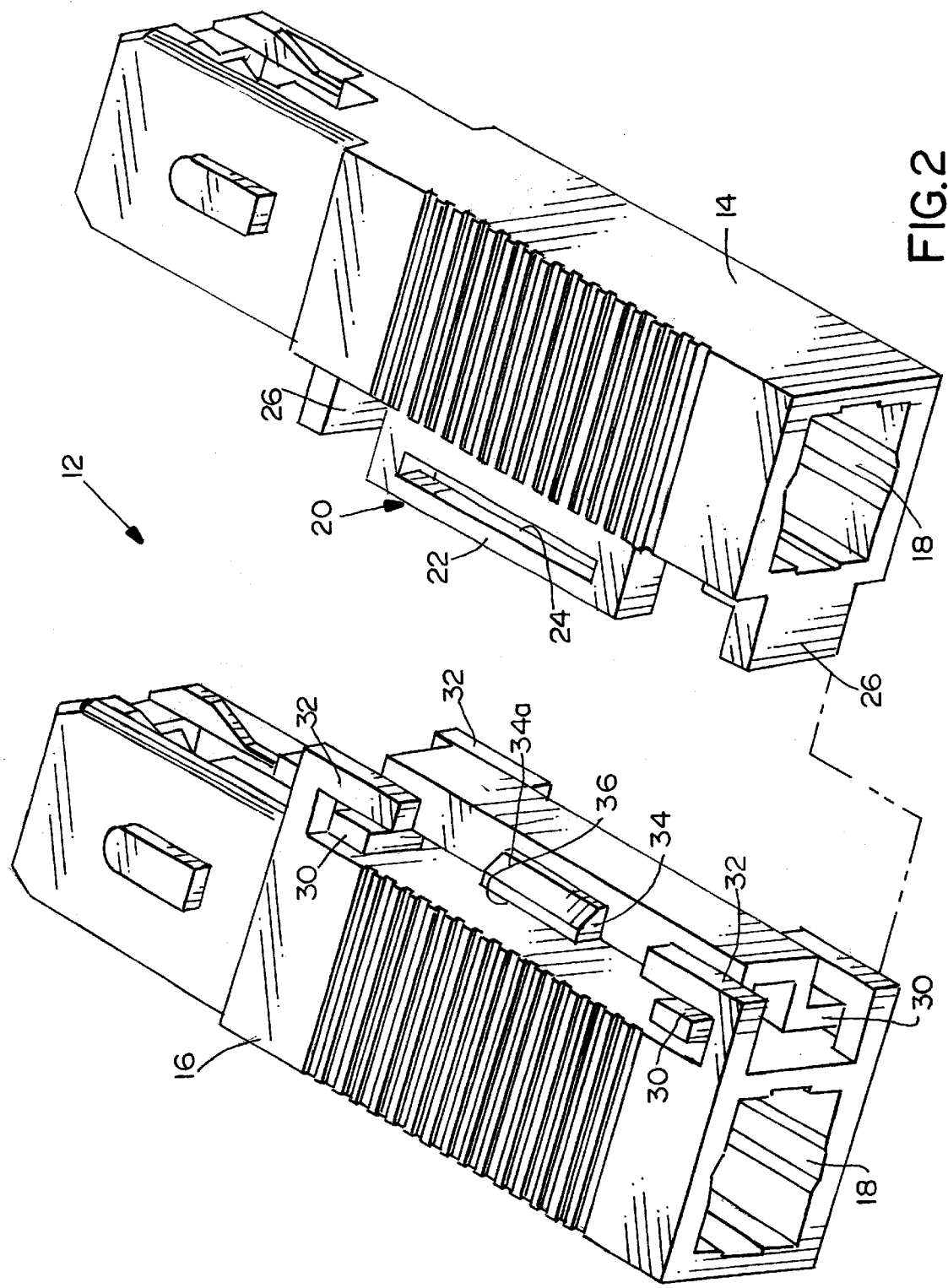
FIG. 2 is a perspective view of the pair of connector housings separated.
Figure 3:
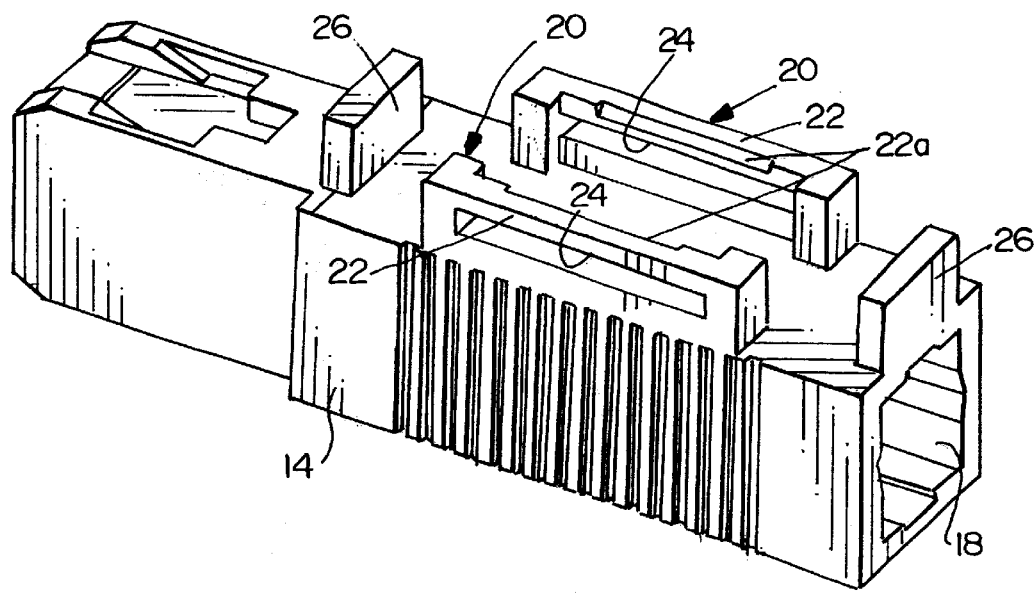
FIG. 3 is a perspective view of the first connector housing.
Figure 4:
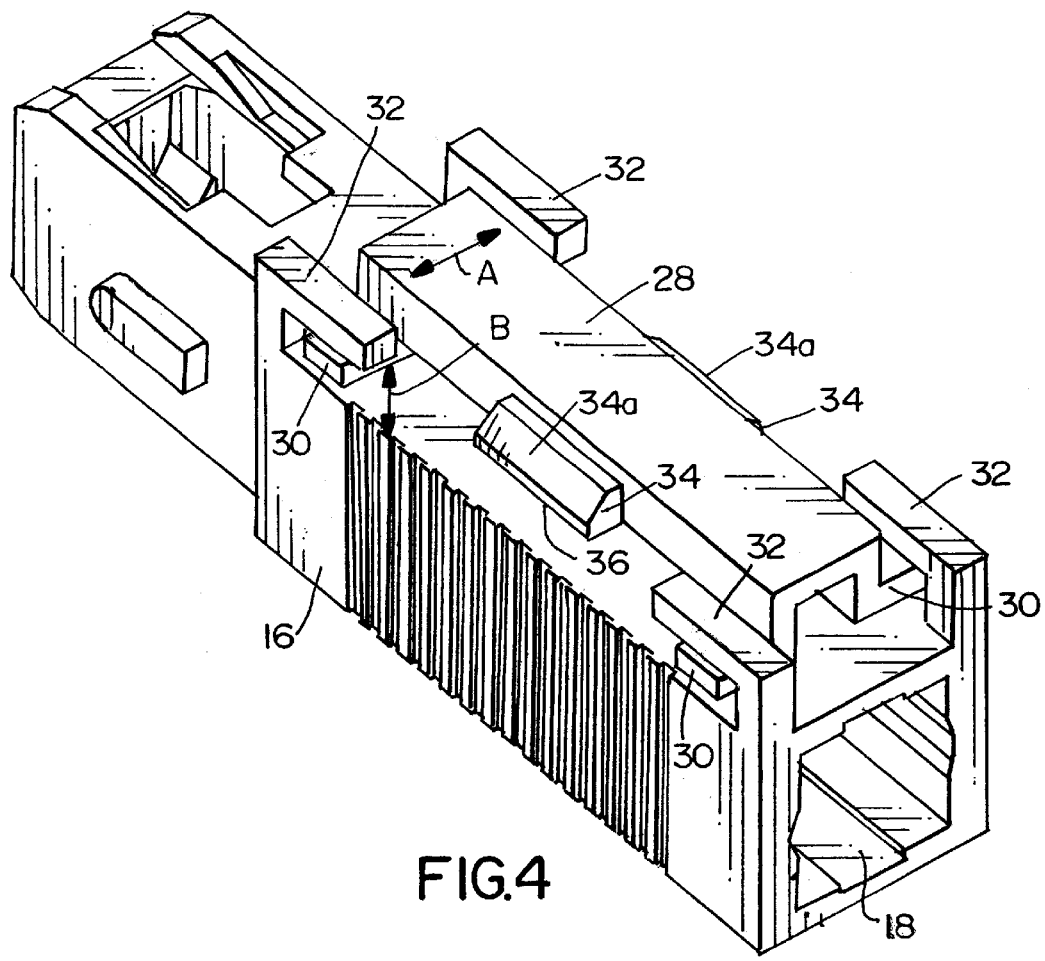
FIG. 4 is a perspective view of the second connector housing and the intermolded latch member.

Referring to FIG. 3 in conjunction with FIGS. 1 and 2, first connector housing 14 is a one-piece structure unitarily molded of dielectric material such as plastic or the like. The housing is elongated and includes a pair of first latches, generally designated 20, molded integrally therewith. Each first latch is formed by a locking flange 22 having an inner chamfered edge 22a. The locking flanges are in the form of elongated bars having elongated openings 24 therebeneath. A pair of end flanges 26 project from the first connector housing beyond locking flanges 22 for aesthetic purposes as well as to provide standoffs between the two connector housings. Second connector housing 16 is a one-piece structure unitarily molded of dielectric material such as plastic or the like. The second connector housing has a latch member 28 permanently molded thereon in loose engagement therewith to provide relative floating movement therebetween. The latch member is elongated and generally rectangular, with four arms 30 projecting laterally outwardly from the four corners thereof. Second connector housing 16 has four hooked arms 32 beneath which arms 30 of the latch member project in a loose engagement as depicted in FIG. 4. In essence, arms 30 and 32 define retention arms for maintaining latch member 28 in loose engagement with second connector housing 16. It also can be seen that the width of latch member 28 is narrower than the distance between each pair of arms 32 at opposite ends of the latch member so that there is relative movement between the latch member and the second connector housing in the direction of arrow "A". The latch member can float relative to the second connector housing in both lateral directions as indicated by arrows "A" and "B" (FIG. 4). The distances that flanges 22 project from housing 14 and hooked arms 32 project from housing 16 define the amount of float in the "B" direction. The width of flanges 26 between hooked arms 32 define or limit the amount of floating in the "A" direction. Therefore, the various gaps between latch member 28 and its arms 30 and housing 16 and its arms 32 can be larger than the amount of floating for better moldability. Relative longitudinal movement between the connector housings is generally not desirable. This is made a minimum by the length of flanges 22 and their abutment with hooked arms 32 as seen in FIG. 1.

Latch member 28 has a pair of second latches 34 in the form of integrally molded flanges projecting outwardly from opposite sides of the latch member. The flanges are chamfered, as at 34a. It can be seen that retention arms 30 project outwardly from the bottom of latch member 28, and latch flanges 34 project outwardly from the top of the latch member so that a space 36 is provided beneath the latch flanges to accommodate locking flanges 22 (FIG. 3) on first connector housing 14. This spacing is shown best in FIG. 1.

Reference also can be made to the isolated depictions of latch member 28 in FIGS. 5 and 6 to show that bottom surfaces 30a of retention arms 30 are offset below bottom surfaces 34b of latch flanges 34. Another purpose for this offset is to make gap 36 (FIG. 4) larger for easy molding by a larger mold blade.

In connecting first connector housing 14 with second connector housing 16 in a side-by-side floating relationship, inner chamfered edges 22a of locking flanges 22 on first connector housing 14 (FIG. 3) are brought into engagement with chamfered sides 34a of latch flanges 34 of latch member 28 (FIG. 4), to snap the first connector housing into interengagement with the latch member on the second connector housing. Since the latch member is mounted for floating movement relative to the second connector housing as described above, the first connector housing, in turn, is mounted on the second connector housing for floating movement relative thereto. In other words, first connector housing 14 derives its floating movement relative to the second connector housing 16 through the floating latch member 28.

FIGS. 7 and 8 show a mold assembly, generally designated 40, for permanently molding latch member 28 onto second connector housing 16 in loose engagement therewith. In other words, the mold assembly facilitates loosely intermolding the latch member and the second connector housing, so that when the housing and the latch member are "intermolded", they cannot be separated without breaking the components. The mold assembly includes a pair of major side molds 42 and 44, a pair of minor side molds 46 and 48 and a core mold 50.

Figure 9:
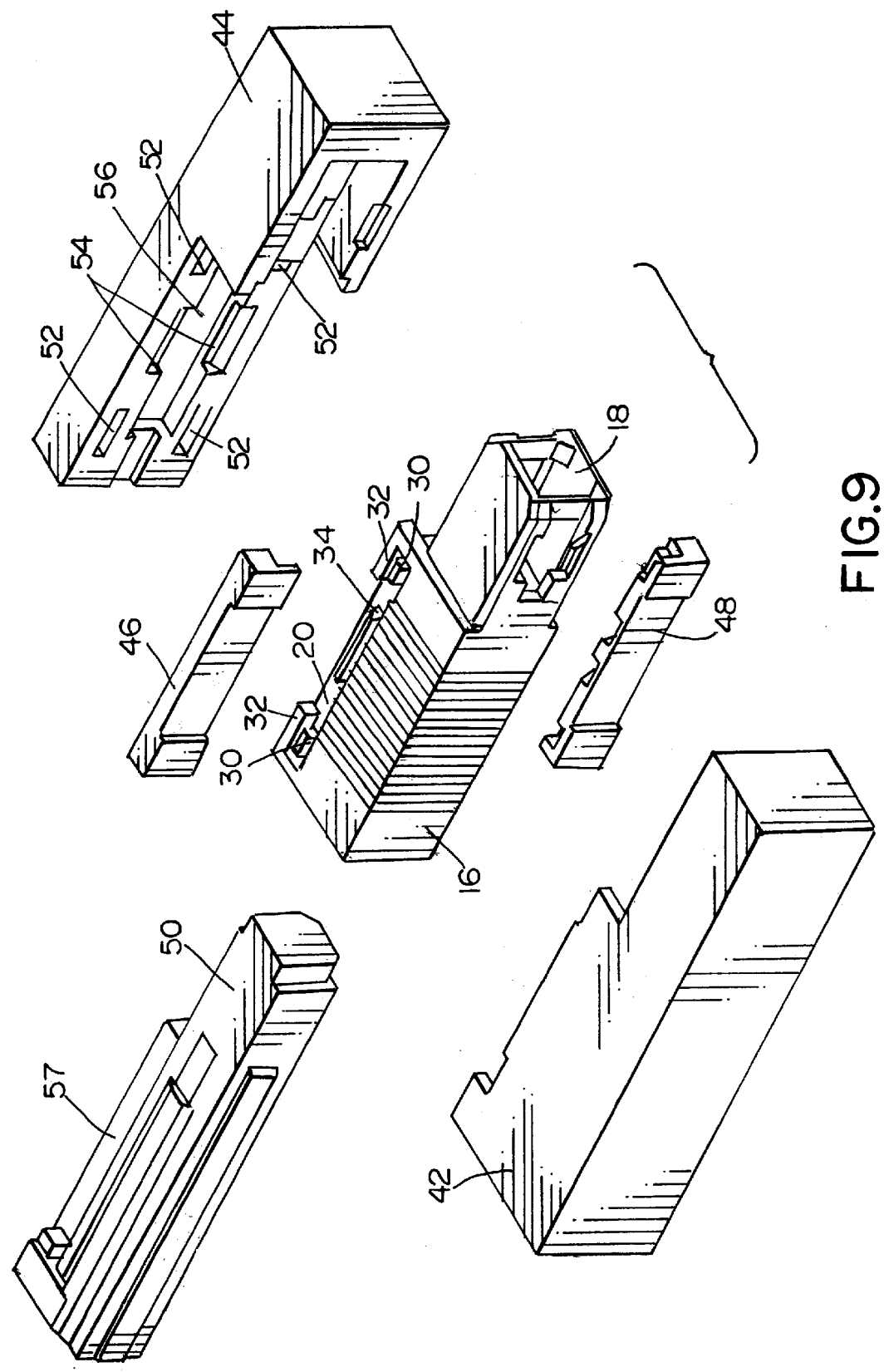
Figure 10:
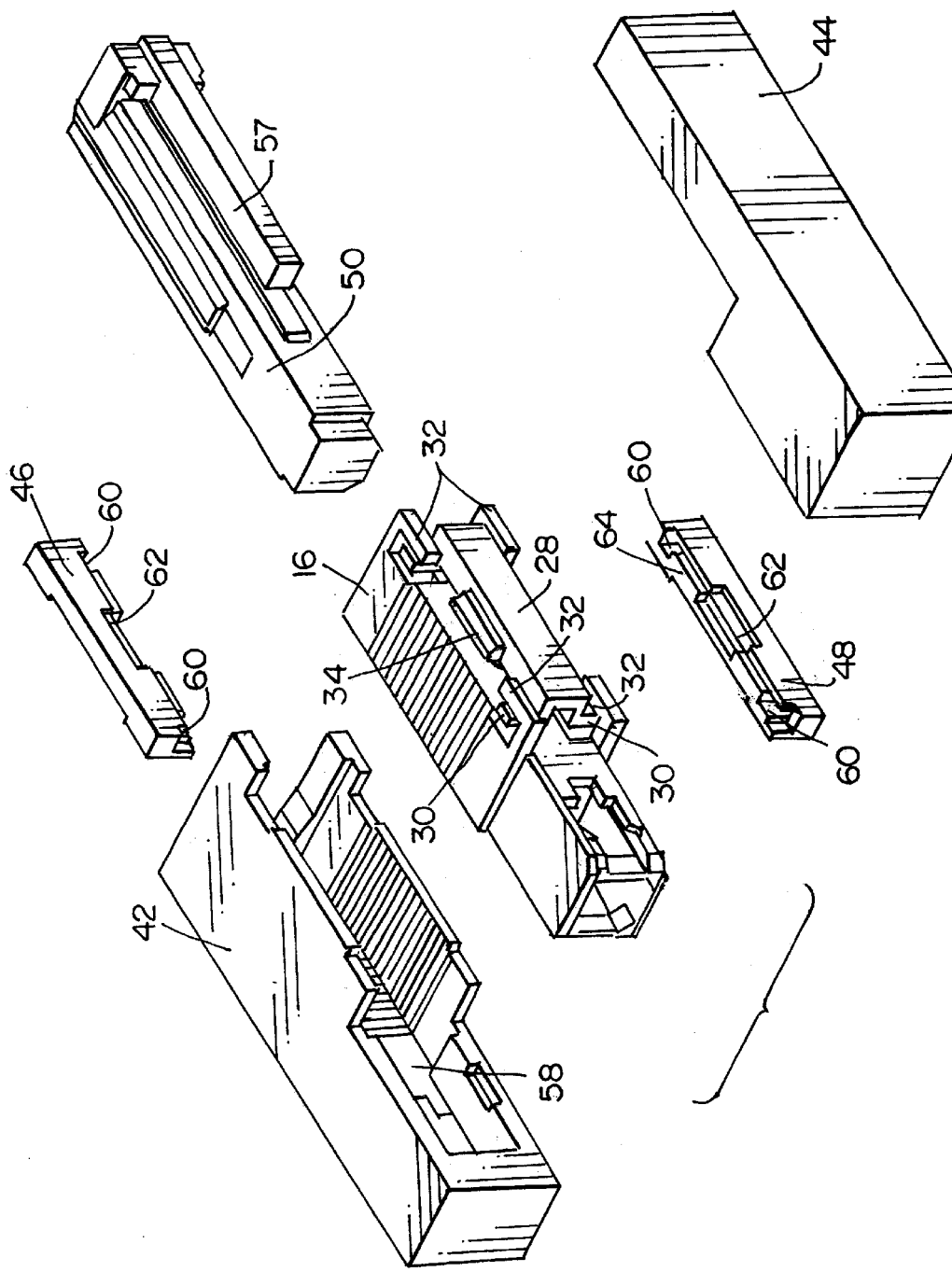

FIGS. 9–11 show the major and minor side molds and the core mold of mold assembly 40 in positional relationship surrounding second connector housing 16 and latch member 28 to show how the latch member is molded in loose engagement with the second connector housing. More particularly, referring first to FIG. 9, major side mold 44 includes cavities 52 for forming hooked retention arms 32 of the connector housing and cavities 54 for forming latch flanges 34 of latch member 28. A cavity 56 runs a substantial length of major side mold 44 to form the main body of latch member 28. Core mold 50 forms the particular configuration of through receptacle 18 within second connector housing 16. The core mold has a longitudinal rib 57 which is effective to form the main body portion of latch member 28 into a generally U-shaped configuration having generally uniform wall thicknesses which allow for generally uniform plastic shrinkage which, in turn, avoids warpage.

Referring to FIG. 10, major side mold 42 has a large cavity 58 for forming the bulk of second connector housing 16. Each minor side mold 46 and 48 has end cavity configurations 60 which form projecting retention arms 30 of latch member 28, and the surrounding portions of the minor side molds separate retention arms 30 from hooked retention arms 32 of the second connector housing. Cavities 62 form chamfered latch flanges 34 on the sides of latch member 28. Minor side molds 46 and 48 have elongated projecting inner portions 64 which meet behind latch member 28 to separate the latch member from the second connector housing. The mold parts therefore form two separate cavities for the two components which are fed molten plastic material through separate insertion gates. FIG. 11 shows a depiction similar to that of FIG. 10 but looking in the opposite longitudinal direction.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for maintaining a pair of fiber optic connectors in a side-by-side relation with float therebetween, comprising:
   a first connector housing for receiving a first optical fiber plug, and including a first latch molded integrally with the first connector housing;
   a second connector housing for receiving a second optical fiber plug; and
   a latch member permanently molded onto the second connector housing, the latch member being separate from the second connector housing to provide a loose engagement therewith and including a second latch for interengagement with the first latch on the first connector housing to hold the connector housings in side-by-side relationship with float therebetween provided by the loosely engaged latch member.

2. The system of claim 1 wherein said second connector housing and said latch member each include at least one retention arm molded integrally therewith, the retention arms being permanently molded in loose interengagement with each other.

3. The method of claim 1 wherein said second connector housing and said latch member are molded simultaneously in loose interengagement in a single mold assembly.

4. A system for maintaining a pair of fiber optic connectors in a side-by-side relation with float therebetween, comprising:
   a first connector housing for receiving a first optical fiber plug, and including a first latch molded integrally with the first connector housing;
   a second connector housing for receiving a second optical fiber plug; and
   a latch member mounted on the second connector housing, the latch member being separate from the second connector housing to provide a loose engagement therewith and including a second latch for interengagement with the first latch on the first connector housing,
   whereby the loose engagement between the latch member and the second connector housing provides float therebetween which, in turn, provides float between the first connector housing and the second connector housing to which the latch member is interengaged.

5. The system of claim 4 wherein said second connector housing and said latch member each include at least one retention arm molded integrally therewith, the retention arms being permanently molded in loose interengagement with each other.

6. A system for maintaining a pair of fiber optic connectors in a side-by-side relation with float therebetween, comprising:
   a first connector housing for receiving a first optical fiber plug, and including a first latch molded integrally with the first connector housing;
   a second connector housing for receiving a second optical fiber plug;
   a latch member mounted on the second connector housing in loose engagement therewith and including a second latch for interengagement with the first latch on the first connector housing,
   whereby the loose engagement between the latch member and the second connector housing provides float therebetween which, in turn, provides float between the first connector housing and the second connector housing to which the latch member is interengaged; and
   said second connector housing and said latch member each including at least one retention arm molded integrally therewith, the retention arms being permanently molded in loose interengagement with each other, the latch member being generally rectangular, with a pair of said interengaging retention arms at each corner of the latch member, and with said second latch being located intermediate opposite ends of the latch member.

7. A system for maintaining a pair of fiber optic connectors in a side-by-side relation with float therebetween, comprising:
   a first connector housing for receiving a first optical fiber plug, and including a first latch molded integrally with the first connector housing;
   a second connector housing for receiving a second optical fiber plug, and including at least one retention arm molded integrally therewith; and
   a latch member including at least one retention arm molded integrally therewith and permanently molded in loose interengagement with the latch arm of the second connector housing, and a second latch on the latch member structured to provide a snap-latch means with the first latch on the first connector housing to hold the connector housings in a side-by-side relationship with float therebetween provided by the loosely engaged latch member.

8. The system of claim 7 wherein said first latch comprises at least one locking flange and said second latch comprises at least one chamfered snap flange for snapping into locking engagement with the locking flange.

9. The system of claim 7 wherein the retention arm on the second connector housing comprises a hooked arm, and the retention arm on the latch member comprises a projecting arm extending beneath the hooked arm.

10. The system of claim 9 wherein said latch member is generally rectangular, with a pair of said interengaging retention arms at each corner of the latch member, and with said second latch being located intermediate opposite ends of the latch member.

11. A system for maintaining a pair of fiber optic connectors in a side-by-side relation with float therebetween, comprising:
   a first connector housing for receiving a first optical fiber plug, and including a first latch molded integrally with the first connector housing;
   a second connector housing for receiving a second optical fiber plug;
   a latch member permanently molded onto the second connector housing in loose engagement therewith and including a second latch for interengagement with the first latch on the first connector housing to hold the connector housings in side-by-side relationship with float therebetween provided by the loosely engaged latch member; and
   said first latch on the first connector housing and said second latch on the latch member being structured to provide a snap-latch means.

12. The system of claim 11 wherein said first latch comprises at least one locking flange and said second latch comprises at least one chamfered snap flange for snapping into locking engagement with the locking flange.

13. A system for maintaining a pair of fiber optic connectors in a side-by-side relation with float therebetween, comprising:

a first connector housing for receiving a first optical fiber plug, and including a first latch molded integrally with the first connector housing;

a second connector housing for receiving a second optical fiber plug;

a latch member permanently molded onto the second connector housing in loose engagement therewith and including a second latch for interengagement with the first latch on the first connector housing to hold the connector housings in side-by-side relationship with float therebetween provided by the loosely engaged latch member; and said second connector housing and said latch member each including at least one retention arm molded integrally therewith, the retention arms being permanently molded in loose interengagement with each other, the retention arm on the second connector housing comprising a hooked arm, and the retention arm on the latch member comprising a projecting arm extending beneath the hooked arm.

14. A system for maintaining a pair of fiber optic connectors in a side-by-side relation with float therebetween, comprising:

a first connector housing for receiving a first optical fiber plug, and including a first latch molded integrally with the first connector housing;

a second connector housing for receiving a second optical fiber plug;

a latch member permanently molded onto the second connector housing in loose engagement therewith and including a second latch for interengagement with the first latch on the first connector housing to hold the connector housings in side-by-side relationship with float therebetween provided by the loosely engaged latch member; and said second connector housing and said latch member each including at least one retention arm molded integrally therewith, the retention arms being permanently molded in loose interengagement with each other, the latch member being generally rectangular, with a pair of said interengaging retention arms at each corner of the latch member, and with said second latch being located intermediate opposite ends of the latch member.

15. A system for maintaining a pair of fiber optic connectors in a side-by-side relation with float therebetween, comprising:

a first connector housing for receiving a first optical fiber plug, and including a first latch molded integrally with the first connector housing;

a second connector housing for receiving a second optical fiber plug;

a latch member mounted on the second connector housing in loose engagement therewith and including a second latch for interengagement with the first latch on the first connector housing, whereby the loose engagement between the latch member and the second connector housing provides float therebetween which, in turn, provides float between the first connector housing and the second connector housing to which the latch member is interengaged; and said first latch on the first connector housing and said second latch on the latch member being structured to provide a snap-latch means.

16. The system of claim 15 wherein said first latch comprises at least one locking flange and said second latch comprises at least one chamfered snap flange for snapping into locking engagement with the locking flange.

17. A system for maintaining a pair of fiber optic connectors in a side-by-side relation with float therebetween, comprising:

a first connector housing for receiving a first optical fiber plug, and including a first latch molded integrally with the first connector housing;

a second connector housing for receiving a second optical fiber plug;

a latch member mounted on the second connector housing in loose engagement therewith and including a second latch for interengagement with the first latch on the first connector housing, whereby the loose engagement between the latch member and the second connector housing provides float therebetween which, in turn, provides float between the first connector housing and the second connector housing to which the latch member is interengaged; and said second connector housing and said latch member each including at least one retention arm molded integrally therewith, the retention arms being permanently molded in loose interengagement with each other, the retention arm on the second connector housing comprising a hooked arm, and the retention arm on the latch member comprising a projecting arm extending beneath the hooked arm.

18. A method for fabricating a pair of fiber optic connectors in a side-by-side relation with float therebetween, comprising the steps of:

molding a first connector housing with a first latch integral therewith;

molding a second connector housing;

molding a latch member onto the second connector housing with the latch member being separate from the second connector housing to provide a loose engagement therewith and with a second latch for interengagement with the first latch on the first connector housing, whereby the connector housings are held in a side-by-side relationship with float therebetween provided by the loosely engaged latch member mounted on the second connector housing.

\* \* \* \* \*